United States Patent

Zieman et al.

[15] 3,640,840
[45] Feb. 8, 1972

[54] COMPONENT REACTION PRODUCT AND PROCESS FOR INCREASING THE WET STRENGTH OF PAPER

[72] Inventors: Heinz Zieman, Leichlingen; Wolfgang Lehmann, Leverkusen; Gerhard Troemel, Pesch, all of Germany

[73] Assignee: Farbenfabriken Bayer Aktiengesellschaft, Leverkusen, Germany

[22] Filed: Mar. 18, 1969

[21] Appl. No.: 808,326

[30] Foreign Application Priority Data

Feb. 10, 1969 Germany......................P 19 06 450.7
Mar. 27, 1968 Germany......................P 17 71 043.9

[52] U.S. Cl. .........................162/164, 162/182, 260/78 SC, 260/78 UA
[51] Int. Cl. .........................................................D21h 3/36
[58] Field of Search ...........162/164, 182; 260/78 SC, 78 UA

[56] References Cited

UNITED STATES PATENTS

| 2,926,116 | 2/1960 | Keim | 162/164 |
| 2,926,154 | 2/1960 | Keim | 162/164 |
| 3,058,873 | 10/1962 | Keim | 162/164 |
| 3,224,986 | 12/1965 | Butler | 260/78 SC |
| 3,332,901 | 7/1967 | Keim | 162/164 |
| 3,442,754 | 5/1969 | Epsy | 162/164 |
| 2,595,935 | 5/1952 | Daniel | 162/164 |

FOREIGN PATENTS OR APPLICATIONS 642,260  5/1962  Canada..................162/164

*Primary Examiner*—S. Leon Bashore
*Assistant Examiner*—Richard H. Anderson
*Attorney*—Plumley, Tyner & Sandt

[57] ABSTRACT

A reaction product and process for increasing the wet strength of paper which comprises adding to a slurry of paper fibers self-cross-linking water soluble reaction products prepared from a) epihalohydrins and/or α-dihalo-hydrins such as epichlorohydrin, b) water soluble basic polyamides such as that formed by the reaction of diethylene-triamine and adipic acid, and c) water soluble polyamines such as bis-(3-aminopropyl)-amine which contain at least two nitrogen atoms separated from one another by at least three carbon atoms and optionally also by oxygen or sulfur atoms, and contain at least two hydrogen atoms attached to different nitrogen atoms wherein the components b) and c) are used in a proportion of 1–10:1 and component a) is used in an amount of 0.5 to 1.5 mole per basic amino group.

19 Claims, No Drawings

COMPONENT REACTION PRODUCT AND PROCESS FOR INCREASING THE WET STRENGTH OF PAPER

The present invention relates to new self-cross-linking water-soluble reaction products, to agents increasing the wet strength of paper and to a process for increasing the wet strength of paper; more particularly it concerns new self-cross-linking water-soluble reaction products of epihalohydrins or α-dihalohydrins which are prepared from epihalohydrins and/or α-dihalohydrins, water-soluble basic polyamides and water-soluble polyamines containing at least two nitrogen atoms which are separated from one another by at least three carbon atoms and optionally also by oxygen or sulphur atoms, and containing at least two hydrogen atoms attached to different nitrogen atoms; furthermore agents for increasing the wet strength of paper containing these new self-cross-linking water-soluble reaction products of epihalohydrins and/or α-dihalohydrins as well as a process of increasing the wet strength of paper by means of these new self-cross-linking water-soluble reaction products.

Examples of water-soluble polyamines from which the self-cross-linking water-soluble reaction products derive are: water-soluble aliphatic polyamines, such as 1,3-bis-(2-amino-ethylamino)-propane, 3-(3-diethylamino-propylamino)-propylamine, bis-(2-amino-ethyl)-ether, 2,2'-bis-methylamino-diethyl ether, 2,2'-bis-(2-amino-ethylamino)-diethyl ether, bis-(3-amino-propyl)-ether, bis-(3-amino-propyl)-sulphide, 1,6-bis-(2-amino-ethylamino)-hexane, 1,6-bis-(3-amino-propylamino)-hexane, bis-(6-amino-n-hexyl)-amine and 1,3-diamino-butane and especially polyalkylene polyamines of the formula $$HN-\begin{bmatrix}R_1\\|\\(CH_2)_n-N\\|\\R_2\end{bmatrix}_m-H$$

wherein $R_1$ and $R_2$ independently of one another denote hydrogen or a $C_1-C_4$-alkyl residue optionally substituted by an amino or a hydroxy group, $m$  is a number from 1–8, preferably 2–4 and $n$  is a number from 3–10, preferably 3–6, e.g., 1,3-diamino-propane, 1-amino-3-methylamino-propane, 1,3-bis-(2-hydroxy-ethylamino)-propane, 1,4-diamino-butane, 1,4-bis-methylamino-butane, N-(3-amino-propyl)-tetramethylene-diamine, N,N'-bis-(3-amino-propyl)-tetramethylene-diamine and especially bis-(3-amino-propyl)-amine and hexamethylene-diamine, furthermore polyamines of the formula

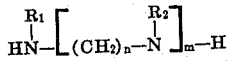

wherein $R_1$   denotes a $C_1-C_{18}$-alkyl residue optionally substituted by an amino or a hydroxy group, $R_2$ and $R_3$   stand independently of one another for hydrogen or a methyl group and the sum $p+q$ is a number from 1–20, preferably 2–5, e.g., ethyl-bis-(3-amino-propyl)-amine, 2-hydroxy-ethyl-bis-(3-amino-propyl)-amine, n-butyl-bis-(3-amino-propyl)-amine, tris-(3-amino-propyl)-amine and especially methyl-bis-(3-amino-propyl)-amine.

Furthermore water-soluble cycloaliphatic and araliphatic polyamines, such as 1,4-diamino-cyclohexane, 1-aminomethyl-5-amino-1,3,3-trimethyl-cyclohexane, 1,3-bis-aminomethyl-benzene and benzyl-bis-(3-amino-propyl)-amine are also suitable.

Examples of water-soluble basic polyamides from which the self-cross-linking water-soluble reaction products according to the invention derive are especially: reaction products of saturated aliphatic $C_4-C_{10}$-dicarboxylic acids, such as succinic acid, glutaric acid, adipic acid, diglycollic acid and sebacic acid, or with their functional derivatives, such as anhydrides or esters, with aliphatic polyamines containing at least two primary amino groups and at least one secondary or tertiary amino group; examples of such amines are for instance methyl-bis-(3-amino-propyl)-amine, ethyl-bis-(3-amino-propyl)-amine, 2-hydroxyethyl-bis-(3-amino-propyl)-amine, N-(3-amino-propyl)-tetramethylene-diamine and N,N'-bis-(3-amino-propyl)-tetramethylene-diamine, but especially polyalkylene polyamines of the formula

wherein $A$    denotes a $C_2-C_8$-alkylene residue, $R_1$ and $R_2$ independently of one another stand for hydrogen or a $C_1-C_{10}$-alkyl residue optionally substituted by an amino or a hydroxy group and $n$   is a number from 2–5, e.g., di-propylene-(1,2)-triamine, bis-(3-amino-propyl)-amine, tri-propylene-(1,2)-tetramine and especially diethylene-triamine, triethylene-tetramine and tetraethylene-pentamine.

As water-soluble basic polyamides should be furthermore mentioned:

a. the reaction products of aliphatic, cycloaliphatic or heterocyclic polyamines which contain at least two primary or two secondary amino groups or at least one primary and one secondary amino group, such as ethylene-diamine, 1,2-diamino-propane, 1-amino-3-methylamino-propane, diethylene-triamine, bis-(3-amino-propyl)-amine, 1,4-diamino-cyclohexane, 1,3-bis-amino-methyl-benzene and piperazine, with α,β-unsaturated carboxylic acid esters, such as acrylic acid ethyl ester and methacrylic acid methyl ester;

b. the reaction products of aliphatic polyamines containing at least two primary amino groups and at least one secondary or tertiary amino group, such as diethylene-triamine, triethylene-tetramine, tetraethylene-pentamine, di-propylene-(1,2)-triamine, bis-(3-amino-propyl)-amine, tri-propylene-(1,2)-tetramine, methyl-bis-(3-amino-propyl)-amine, ethyl-bis-(3-amino-propyl)-amine, 2-hydroxyethyl-bis-(3-amino-propyl)-amine, N-(3-amino-propyl)-tetramethylene-diamine and N,N'-bis-(3-amino-propyl)-tetramethylene-diamine, with ξ-aminocarboxylic acids containing at least three carbon atoms, or with their lactams, such as 6-amino-caproic and 8-amino-caprylic acid or 6-caprolactam and 8-caprylolactam;

c. the reaction products of polyamines of the type mentioned under (b) with unsaturated dicarboxylic acids, such as maleic acid or fumaric acid or with their functional derivatives, such as anhydrides or esters; as well as in particular, d. such reaction products which are derived besides from the polyamines mentioned under (b) from aliphatic, cycloaliphatic, araliphatic or heterocyclic polyamines containing two primary or two secondary amino groups or one primary and one secondary amino group, such as ethylene-diamine, N-(2-hydroxy-ethyl)-ethylene-diamine, N,N'-dimethyl-ethylene-diamine, 1,2-diamino-propane, 1,6-diamino-hexane, 1,4-diamino-cyclohexane, 1,3-bis-aminomethyl-benzene or piperazine, and are derived, besides from saturated $C_4-C_{10}$-dicarboxylic acids and unsaturated dicarboxylic acids of the type mentioned under (c), from ξ-aminocarboxylic acids or their lactams of the type mentioned under (b); those basic polyamides are preferred which are derived, besides from polyamines of the type mentioned under (b) and besides from saturated $C_4-C_{10}$-dicarboxylic acids, from ξ-aminocarboxylic acids or their lactams of the type mentioned under (b).

The proportions which are to be observed between the components concerned, in order to obtain water-soluble polyamides can easily be established by preliminary experiments. In the case of polyamides which are derived from polyamines of the type mentioned in the preceding paragraph under (b) or from mixtures of such polyamines with polyamines of the type there mentioned under (d), on the one hand, and from dicarboxylic acids of the type there mentioned under (c) or saturated aliphatic $C_4$–$C_{10}$-carboxylic acids or from mixtures of such dicarboxylic acids with $\xi$-aminocarboxylic acids or their lactams of the type there mentioned under (b), on the other hand, the molar proportions between polyamines and dicarboxylic acids expediently amount to 0.8–1.4:1, preferably 1–1.1:1.

The polyamides can be prepared in the usual manner, for example, by heating the components concerned with the exclusion of oxygen for several hours at temperatures of 125°–250° C., initially under normal pressure and then under reduced pressure; small amounts of hydrazine hydrate or hydrazides may be added, in order to avoid a dark coloration of the polyamides.

In the self-cross-linking water-soluble reaction products of epihalohydrins and/or α-dihalohydrins the proportions between the polyamides and polyamines may also vary within wide limits; in general those reaction products will be preferred for the preparation of which the polyamides and polyamines have been used in a proportion of 1–10:1.

Examples of epihalohydrins and α-dihalohydrins which have served for the preparation of the reaction products according to the invention are epibromohydrin or α-dibromohydrin, but chiefly epichlorohydrin and α-dichlorohydrin. Those reaction products are preferred which have been prepared with the use of 0.5–1.5 mole, especially 0.8–1.2 mole, of epihalohydrins or α-dihalohydrins per basic amino group in polyamides and polyamines.

The components, epihalohydrins and/or α-dihalohydrins, polyamides and polyamines, can be reacted in any sequence in the preparation of the reaction products according to the invention. For instance epihalohydrins and/or α-dihalohydrins can be reacted with mixtures of a polyamide and a polyamine, for example in the manner that neutral or alkaline aqueous solutions containing about 25–50 percent by weight of mixtures which consist of epihalohydrins respectively α-dihalohydrins, polyamides and polyamines, are stirred at a temperature between 25° and 95° C., preferably between 40° and 70° C., until a sample of the reaction mixture in the form of a 10 percent aqueous solution at 25° C. has a viscosity of at least 5 c.p., preferably 15–30 c.p. To complete the reaction and to stabilize the self-cross-linking reaction products, it is expedient then to add such an amount of hydrochloric acid, sulphuric acid or acetic acid to the reaction mixture that the pH value of the aqueous solution is between 3 and 6, preferably between 4 and 5, and to adjust the solids content of the reaction solution to about 10–20 percent by weight by diluting with water.

But the reaction can also be carried out in such a manner, that one of the two basic components is precondensed with the halohydrins and the precondensate such obtained is reacted in a second stage with the other basic component.

In some cases it has proved to be of advantage to start the reaction in the presence of water-soluble alcohols and later on to complete the reaction in a water-containing medium by adding water.

In order to increase the wet strength of paper according to the process of the present invention, a known procedure may be followed, for example, by adding the reaction products concerned in the form of aqueous solutions already to the aqueous suspension of the paper pulp and then to work up the pulp suspension into paper. The amount of reaction products which are required to achieve the desired wet strength can be ascertained without difficulty by preliminary experiments; in general, it is recommended to use, per 1,000 parts by weight of paper pulp or paper, 1–100 parts by weight of an aqueous solution containing 10–20 percent by weight of reaction products.

With the aid of the reaction products according to the invention it is possible to improve the wet strength of paper—including paper made of unbleached cellulose—to an outstanding degree. It is remarkable that the reaction products have virtually no adverse effect on the degree of whiteness of paper produced from bleached cellulose, and that they are readily compatible with the optical whitening agents which are frequently used for brightening paper. Paper for labels which have been treated according to the invention is very resistant to lyes; consequently, the labels produced from such paper and applied to bottles and the like do not tend to disintegrate when the bottles and the like are cleaned and rinsed in the usual way with alkaline cleansing liquids, and the cleansing liquids and bottles are thus not soiled by cellulose fibers. Laminated papers made of cellulose or cellulose products which have been treated according to the invention have a pH value rendering them suitable as decorative papers for the production of molded laminated plates. It may further be mentioned that the speed with which the reaction products to be used according to the invention are cross-linked on the paper or in the cellulose is high and that the reaction products, when used in cellulose suspensions, have an advantageous effect on the retention of fine fibers, fillers and optionally of pigments as well as on the dehydration speed. The reaction products of epihalohydrins or α-dihalohydrins on polyamides or the reaction products of epihalohydrins or α-dihalohydrins on polyamines which have hitherto been used for improving the wet strength of paper do not have these valuable properties to the same extent.

Some of the self-cross-linking water-soluble reaction products according to the invention and their use for wet strengthening of paper are for instance described in the following.

REACTION PRODUCT 1 a. 108 g. (1.05 mole) diethylene-triamine are mixed with 146 g. (1 mole) adipic acid with the addition of 9 g. (0.05 mole) adipic acid dihydrazide in a reaction vessel fitted with gas feed tube and descending cooler, and the mixture is heated with stirring to 190° C. within 3 to 4 hours while oxygen-free nitrogen is passed over; in the range from 150°–190° C. the reaction temperature is raised as the water formed is continuously distilled off. When about 30 g. of water and small amounts of diethylene-triamine have distilled over, the reaction mixture is stirred at 190°–180° C. under reduced pressure (20 to 50 mm. Hg) until a total of 44 g. of distillate have been obtained; it is then cooled to 130° C. and mixed with the same amount (219 g.) of water. The resultant basic polyamide is thus obtained in the form of a 50 percent aqueous solution which has a viscosity of 300–400 c.p. at 25° C. and an equivalent weight of 340.

b. A mixture of 340 g. (1 val) of this 50 percent polyamide solution, 65.5 g. (0.5 mole) bis-(3-amino-propyl)-amine and 740 g. of water is treated dropwise at 30° C. within 30 minutes, while stirring, with 255 g. (2.75 mole) epichlorohydrin and subsequently heated with stirring to 55° to 65° C. As soon as the solution has a viscosity of about 100 c.p. at this temperature, this being the case after 1 to 2 hours, it is mixed with 560 g. of water and stirring is continued at 55°–60 C. until the 25 percent solution then present has a viscosity of about 125 c.p. at this temperature. 2,925 g. of water and 20 g. of concentrated hydrochloric acid are then added to the solution. The resultant aqueous 10 percent solution of the reaction product formed has a pH value of 4 to 5 and a viscosity of 20–30 c.p. at 25° C.

REACTION PRODUCT 2

340 g. (1 val) of the 50 percent polyamide solution described as reaction product 1 (a), are mixed with 72.5 g. (0.5 mole) methyl-bis-(3-amino-propyl)-amine and 1,390 g. of water. The mixture is then treated dropwise at 30° C. within 40 minutes, while stirring, with 277.5 g. (3 mole) epichlorohydrin and subsequently heated with stirring to 60° to 70° C. As soon as the solution has a viscosity of about 140 c.p. at 65° C., this being the case after about 7 hours, it is mixed with 3,200 g. of water and 20 g. of concentrated hydrochloric acid. The resultant 10 percent solution of the reaction product formed has a pH value of 4 to 5 and a viscosity of 20–30 c.p. at 25° C.

REACTION PRODUCT 3 a. 108 g. (1.05 mole) diethylene-triamine, 146 g. (1.0 mole) adipic acid and 28 g. (0.25 mole) ε-caprolactam are reacted with the addition of 9 g. (0.05 mole) adipic acid dihydrazide in the manner described for the preparation of reaction product 1 (a) to form the corresponding basic polyamide. The 50 percent polyamide solution obtained after the addition of the same amount by weight of water has a viscosity of 400–500 c.p. at 25° C. and an equivalent weight of 400.

b. A mixture of 400 g. (1 val) of this 50 percent polyamide solution, 36 g. (0.25 mole) methyl-bis-(3-amino-propyl)-amine and 1,064 g. of water is treated dropwise at 30° C. within 30 minutes, while stirring, with 185 g. (2 mole) epichlorohydrin and subsequently heated to 55°–60° C. while stirring. As soon as the solution has a viscosity of about 150 c.p. at 55° C., this being the case after about 5 hours, it is mixed with 2,495 g. of water and 50 g. of concentrated hydrochloric acid. The resultant 10 percent solution of the reaction product formed has a pH value of 4 to 5 and a viscosity of 25–35 c.p. at 25° C.

REACTION PRODUCT 4

400 g. (1 val) of the 50 percent polyamide solution described as reaction product 3 (a) are mixed with 101 g. (0.5 mole) N,N'-bis-(3-amino-propyl)-tetramethylene-diamine and 1,675 g. of water. The mixture is then treated dropwise at 30°–35 C. within 40 minutes, while stirring, with 324 g. (3.5 mole) epichlorohydrin, subsequently stirred at 60°–65° C. until the viscosity of the solution has risen to about 130 c.p. at 60° C., and then mixed with 3,715 g. of water and 35 g. of concentrated hydrochloric acid. The resultant 10 percent solution of the reaction product formed has a pH value of 4 to 5 and a viscosity of 20–30 c.p. at 25° C.

REACTION PRODUCT 5

400 g. (1 val) of the 50 percent polyamide solution described as reaction product 3 (a) are mixed with 58 g. (0.5 mole) hexamethylene-diamine and 1,271 g. of water. The mixture is then treated dropwise at 25°–30° C. within 30 minutes, while stirring, with 231 g. (2.5 mole) epichlorohydrin, subsequently stirred at 55°–60° C. until the viscosity of the solution has risen to about 150 c.p. at 55° C., this being the case after about 7 hours, and then mixed with 2,900 g. of water and 30 g. of concentrated hydrochloric acid. The resultant 10 percent solution of the reaction product formed has a pH value of 4 to 5 and a viscosity of 20–30 c.p. at 25° C.

REACTION PRODUCT 6 a. 113 g. (1.1 mole) diethylene-triamine, 146 g. (1 mole) adipic acid and 56.5 g. (0.5 mole) ε-caprolactam are reacted with the addition of 9 g. (0.05 mole) adipic acid dihydrazide in the manner described for the preparation of reaction product 1 (a) to form the corresponding basic polyamide. The 50 percent polyamide solution obtained after the addition of the same amount by weight of water has a viscosity of 400–500 c.p. at 25° C. and an equivalent weight of 430.

b. A mixture of 430 g. (1 val) of this 50 percent polyamide solution, 72.5 g. (0.5 mole) methyl-bis-(3-amino-propyl)-amine and 1,480 g. of water is treated dropwise at 20°–25 C. within 20 minutes, while stirring, with 277.5 g. (3 mole) epichlorohydrin and subsequently stirred at 65°–70° C. until the viscosity of the solution has risen to about 150 c.p. at 65° C., this being the case after about 8 hours, and then mixed with 3,360 g. of water and 30 g. of concentrated hydrochloric acid. The resultant 10 percent solution of the reaction product formed has a pH value of 4 to 5 and a viscosity of 22 c.p. at 25° C.

REACTION PRODUCT 7

430 g. (1 val) of the 50 percent polyamide solution described as reaction product 6 (a) are mixed with 145 g. (1 mole) methyl-bis-(3-amino-propyl)-amine and 1,975 g. of water. The mixture is then treated dropwise at 30° to 35° C. within 1 hour, while stirring, with 370 g. (4 mole) epichlorohydrin, subsequently stirred at 65°–70° C. until the viscosity of the solution has risen to about 170 c.p. at 65° C., this being the case after about 5 hours, and mixed with 4,340 g. of water and 40 g. of concentrated hydrochloric acid. The resultant 10 percent solution of the reaction product formed has a pH value of 4 to 5 and a viscosity of 25 c.p. at 25° C.

REACTION PRODUCT 8

340 g. (1 val) of the 50 percent polyamide solution described as reaction product 1 (a) are diluted with 1,106 g. of water and then treated at 25° C. with 218 g. (2.35 mole) epichlorohydrin. After stirring for 1 hour at 35° C. 36 g. (0.25 mole) methyl-bis-(3-amino-propyl)-amine are added. Subsequently the reaction mixture is warmed to 60° C. and stirred at this temperature until the viscosity of the solution has risen to 120 c.p. at 60° C., this being the case after about 5 hours, and then mixed with 385 g. of water and 35 g. of concentrated hydrochloric acid. The resultant 20 percent solution of the reaction product formed has a pH value of 3 to 3.5 and a viscosity of 80 to 90 c.p. at 25° C.

EXAMPLE 100 kg. of a 0.25 percent suspension, prepared in the usual manner, of a mixture of 84 parts by weight of bleached sulphite cellulose with a degree of grinding of 35° Schopper-Riegler add 16 parts by weight titanium dioxide are mixed with 10 g. of the 10 percent aqueous solution of the reaction product 1 (b). The paper pulp suspension is then diluted with 500 kg. of water and worked up at a pH value of 6 to 7 in a sheet former (Rapid-Kothen apparatus) to produce paper with a surface weight of 80 g./sq. m., the paper being first dried at 95° C. in a vacuum with a pressure of 20 mm. Hg and then heated at 110° C. for 10 minutes.

The paper thus obtained has a wet strength which is substantially higher than the wet strength of a paper which has been produced from the same sulphite cellulose under the same conditions but without the addition of the aqueous solution of the reaction product.

If the 10 percent aqueous solution of reaction product 1 (b) is replaced with a 10 percent aqueous solution of one of the reaction products 2, 3 (b), 4, 5, 6 (b), 7 or 8 described above, then the paper obtained also has a wet strength which is substantially higher than the wet strength of a paper which has been produced under the same conditions without the addition of the aqueous solution of the reaction product.

The increase which is obtained by the reaction products 1 (b), 2, 3 (b), 4, 5, 6, 7 or 8 with regard to the wet strength of the paper can be seen from the following table in which the wet breaking length is stated in each case in $m$ as a measure of the wet strength. The table also shows the increase achieved by the reaction products 1 to 8 in respect of the retention of titanium dioxide, the ash content of the paper being given as measure of the retention. Finally, the table also shows the technical advance which is achieved with the reaction products to be used according to the invention, compared with the most closely related agents for increasing the wet strength of paper according to the state of the art. These agents are the 10 aqueous solution of the reaction product of epichlorohydrin with the water-soluble basic polyamide or diethylene triamine and adipic acid (product I) prepared according to U.S. Pat. specification No. 2,926,116, and the 10 percent aqueous solution of the reaction product of epichlorohydrin with methyl-bis-(3-aminopropyl)-amine (product II) prepared according to British Pat. specification No. 745,499.

TABLE

| Reaction product | Wet breaking length of paper as m. | Ash content of paper as % by weight |
| --- | --- | --- |
| without addition | 130 | 5.0 |
| 1 (b) | 990 | 9.3 |
| 2 | 980 | 9.4 |
| 3 (b) | 1060 | 9.0 |
| 4 | 980 | 9.6 |
| 5 | 960 | 8.9 |
| 6 (b) | 1000 | 9.1 |
| 7 | 980 | 9.7 |
| 8 | 1020 | 9.7 |
| I | 940 | 7.8 |
| II | 750 | 8.2 |

The advance which is achieved according to the above table in respect of the wet strength of the paper and of the retention of titanium dioxide when the reaction products I or II belonging to the state of the art are replaced with the reaction products to be used according to the invention is surprising, the more so, since the values for the wet breaking length and the ash content of the paper obtained when mixtures of equal parts by weight of reaction product I and reaction product II are used under the same conditions are only 840 and 8.1, respectively, i.e., between the values obtained when these products were used by themselves, as was to be expected.

The process according to the invention can also be carried out with the use of self-cross-linking water-soluble products which are not derived from uniform polyamides and uniform polyamines, but from mixtures of suitable polyamides and/or mixtures of suitable polyamines.

We claim:

1. In a process for the production of paper having improved wet strength by incorporating wet strengthening agents into a slurry of paper fibers, and forming paper therefrom, the improvement which comprises, adding in an amount sufficient to increase the wet strength of said paper, a self cross-linking water-soluble reaction product which is prepared from at least one each of members a), b), and c) said members being components selected from the groups consisting of a) epihalohydrins, α-dihalohydrins, and both epihalohydrins and α-dihalohydrins, b) water-soluble basic polyamides and c) water-soluble polyamines which are selected from the group consisting of water-soluble polyamines which contain at least two nitrogen atoms separated from one another by at least three carbon atoms and which contain at least two hydrogen atoms attached to different nitrogen atoms, water soluble polyamines which contain at least two nitrogen atoms separated from one another by at least three carbon atoms and by oxygen atoms and contain at least two hydrogen atoms attached to different nitrogen atoms, and water soluble polyamines which contain at least two nitrogen atoms separated from one another by at least three carbon atoms and by sulphur atoms and contain at least two hydrogen atoms attached to different nitrogen atoms wherein the components b) and c) are used in a proportion of 1–10:1 and component a) is used in an amount of 0.5–1.5 mole per basic amino group.

2. Process according to claim 1 wherein the wet-strengthening agent is prepared by reacting, in a single stage, epichlorohydrin and a mixture of a basic polyamide and a polyamine.

3. Self-cross-linking water soluble reaction products of at least one each of members a), b), and c) said members being components selected from the groups consisting of a) epihalohydrins, α-dihalohydrins, and both epihalohydrins and α-dihalohydrins, b) water soluble basic polyamides, and c) water soluble polyamines which are selected from the group consisting of water soluble polyamines which contain at least two nitrogen atoms separated from one another by at least three carbon atoms and contain at least two hydrogen atoms attached to different nitrogen atoms, water soluble polyamines which contain at least two nitrogen atoms separated from one another by at least three carbon atoms and by oxygen atoms and contain at least two hydrogen atoms attached to different nitrogen atoms, and water soluble polyamines which contain at least two nitrogen atoms separated from one another by at least three carbon atoms and by sulphur atoms and contain at least two hydrogen atoms attached to different nitrogen atoms wherein the components b) and c) have been reacted in a proportion of 1–10:1 and component a) has been used in an amount of 0.5 to 1.5 mole per basic amino group.

4. Process according to claim 1 wherein the polyamines c) are selected from the group consisting of polyamines of the formula

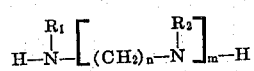

wherein
$R_1$ and $R_2$ independently of one another are selected from the class consisting of hydrogen, $C_1$–$C_4$ alkyl, $C_1$–$C_4$ alkyl substituted by a hydroxy group; $m$ is a number from 1–8 and $n$ is a number from 1–10.

5. Process according to claim 1 wherein the polyamines c) are selected from polyamines of the formula

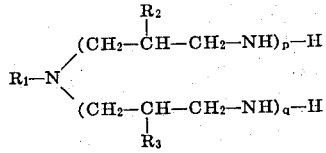

wherein
$R_1$ is selected from the class consisting of $C_1$–$C_{18}$ alkyl, $C_1$–$C_{18}$ alkyl substituted by an amino group and $C_1$–$C_{18}$ alkyl substituted by a hydroxy group, $R_2$ and $R_3$ independently of one another are selected from the class consisting of H and methyl and the sum of $p$ and $q$ is a number from 1–20.

6. Process according to claim 1 wherein the water soluble polyamine c) is selected from the class consisting of bis-(3-amino-propyl)-amine; methyl-bis-(3-amino-propyl)-amine and hexamethylene diamine.

7. Process according to claim 1 wherein the water soluble basic polyamides b) are reaction products of 1) a member selected from the class consisting of saturated aliphatic $C_4$–$C_{10}$ dicarboxylic acids and 2) a member selected from the class consisting of aliphatic polyamines containing at least two primary amino groups and at least one secondary amino group and aliphatic polyamines containing at least two primary amino groups and at least one tertiary group.

8. Process according to claim 7 wherein the polyamines 2) and acids 1) are used in a molar proportion of 0.8–1.4:1.

9. Process of claim 7 wherein the acids 1) are selected from the class consisting of succinic acid, glutaric acid, and adipic acid.

10. Process according to claim 7 wherein the aliphatic polyamines 2) are selected from polyalkylene polyamines of the formula

wherein
A is selected from the class consisting of $C_2$–$C_8$ alkylene; $R_1$ and $R_2$ are independently of one another are selected from the class consisting of $C_1$–$C_{10}$ alkyl, $C_1$–$C_{10}$ alkyl containing an amino substituent, and $C_1$–$C_{10}$ alkyl containing a hydroxy substituent and $n$ is a number from 2–5.

11. Process according to claim 7 wherein the polyamines 2) are selected from the class consisting of diethylenetriamine, triethylene-tetramine, and tetraethylene pentamine.

12. Products according to claim 3 wherein the polyamines c) are selected from the group consisting of polyamines of the formula

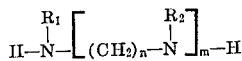

wherein
$R_1$ and $R_2$ independently of one another are selected from the class consisting of hydrogen, $C_1$–$C_4$ alkyl, $C_1$–$C_4$ alkyl substituted by an amino group and $C_1$–$C_4$ alkyl residue substituted by a hydroxy group; $m$ is a number from 1–8 and $n$ is a number from 1–10.

13. Products according to claim 3 wherein the polyamines c) are selected from polyamines of the formula

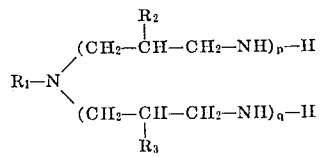

wherein
$R_1$ is selected from the class consisting of $C_1$–$C_{18}$ alkyl, $C_1$–$C_{18}$ alkyl substituted by an amino group and $C_1$–$C_{18}$ alkyl substituted by a hydroxy group, $R_2$ and $R_3$ independently of one another are selected from the class consisting of H and methyl and the sum of $p$ and $q$ is a number from 1–20.

14. Products according to claim 3 wherein the water soluble polyamine c) is selected from the class consisting of bis--(3-amino-propyl)-amine; methyl-bis-(3-amino-propyl)-amine and hexamethylene diamine.

15. Products according to claim 3 wherein the water soluble basic polyamides b) are selected from the group consisting of the reaction product of 1) a member selected from the class consisting of saturated aliphatic $C_4$–$C_{10}$ dicarboxylic acids and 2) a member selected from the class consisting of aliphatic polyamines containing at least two primary amino groups and at least one secondary amino group and aliphatic polyamines containing at least two primary amino groups and at least one tertiary amino group.

16. Products according to claim 14 wherein the polyamines 2) and acids 1) are used in a molar proportion of 0.8–1.4:1.

17. Products of claim 14 wherein the acids 1) are selected from the class consisting of succinic acid, glutaric acid, and adipic acid.

18. Products according to claim 14 wherein the aliphatic polyamines 2) are selected from polyalkylene polyamines of the formula

wherein
A is selected from the class consisting of $C_2$–$C_8$ alkylene; $R_1$ and $R_2$ independently of one another are selected from the class consisting of $C_1$–$C_{10}$ alkyl, $C_1$–$C_{10}$ alkyl containing an amino substituent, and $C_1$–$C_{10}$ alkyl containing a hydroxy substituent and $n$ is a number from 2–5.

19. Products according to claim 14 wherein the polyamines 2) are selected from the class consisting of diethylene-triamine, triethylene-tetramine, and tetraethylene pentamine.

* * * * *